(12) United States Patent
Bhan et al.

(10) Patent No.: US 7,727,929 B2
(45) Date of Patent: *Jun. 1, 2010

(54) PROCESS AND CATALYST FOR THE SELECTIVE HYDROGENATION OF DIOLEFINS CONTAINED IN AN OLEFIN CONTAINING STREAM AND FOR THE REMOVAL OF ARSENIC THEREFROM AND A METHOD OF MAKING SUCH CATALYST

(75) Inventors: Opinder Kishan Bhan, Katy, TX (US); Paul Benjerman Himelfarb, Houston, TX (US)

(73) Assignee: Shell Oil Company, Houston, TX (US)

( * ) Notice: Subject to any disclaimer, the term of this patent is extended or adjusted under 35 U.S.C. 154(b) by 1385 days.

This patent is subject to a terminal disclaimer.

(21) Appl. No.: 10/868,089

(22) Filed: Jun. 15, 2004

(65) Prior Publication Data

US 2005/0014639 A1    Jan. 20, 2005

Related U.S. Application Data

(60) Provisional application No. 60/478,797, filed on Jun. 16, 2003.

(51) Int. Cl.
| | | |
|---|---|---|
| *B01J 23/883* | (2006.01) | |
| *B01J 23/88* | (2006.01) | |
| *B01J 23/76* | (2006.01) | |
| *B01J 23/755* | (2006.01) | |
| *B01J 23/28* | (2006.01) | |
| *C07C 7/163* | (2006.01) | |
| *C07C 5/03* | (2006.01) | |

(52) U.S. Cl. ............... 502/315; 502/305; 502/313; 502/314; 502/321; 502/325; 502/326; 585/259; 208/251 R; 208/253

(58) Field of Classification Search ............... 502/305, 502/313, 314, 315, 321, 325, 326; 585/259; 208/251, 253
See application file for complete search history.

(56) References Cited

U.S. PATENT DOCUMENTS

| | | | |
|---|---|---|---|
| 3,285,860 A | 11/1966 | Richardson | 252/465 |
| 3,617,528 A | 11/1971 | Hilfman | 208/216 |
| 3,840,473 A | 10/1974 | Beuther et al. | 252/439 |
| 4,046,674 A * | 9/1977 | Young | 208/251 H |
| 4,048,115 A | 9/1977 | O'Hara | 252/465 |
| 4,051,022 A | 9/1977 | Myers et al. | 208/253 |
| 4,059,504 A | 11/1977 | Bauer | 208/255 |
| 4,102,822 A | 7/1978 | Mulaskey | 252/465 |

(Continued)

FOREIGN PATENT DOCUMENTS

CN    1132482    10/1996

(Continued)

*Primary Examiner*—Timothy C Vanoy
*Assistant Examiner*—Diana J Liao
(74) *Attorney, Agent, or Firm*—Charles W. Stewart (57) ABSTRACT

A catalyst having dual functionality for the removal of arsenic and the selective hydrogenation of diolefins from monoolefin-containing hydrocarbon streams that have an arsenic concentration and a diolefin concentration, and processes for making and using such catalyst. The catalyst is a heat treated shaped mixture of a refractory oxide and a Group VIII metal that is overlaid with additional Group VIII metal.

18 Claims, 2 Drawing Sheets

U.S. PATENT DOCUMENTS

| | | | |
|---|---|---|---|
| 4,317,746 A | 3/1982 | Richardson | 252/435 |
| 4,354,927 A | 10/1982 | Shih et al. | 208/251 H |
| 4,446,248 A | 5/1984 | Simpson et al. | 502/211 |
| 4,455,390 A | 6/1984 | Ting et al. | 502/314 |
| 4,456,699 A | 6/1984 | Hensley, Jr. et al. | 502/208 |
| 4,460,698 A | 7/1984 | Hensley, Jr. et al. | 502/66 |
| 4,460,707 A | 7/1984 | Simpson | 502/315 |
| 4,490,480 A | 12/1984 | Lok et al. | 502/315 |
| 4,513,097 A | 4/1985 | Angmorter et al. | 502/211 |
| 4,719,006 A | 1/1988 | Goyal | 208/251 R |
| 4,738,944 A | 4/1988 | Robinson et al. | 502/211 |
| 4,760,045 A | 7/1988 | Oishi et al. | 502/321 |
| 4,846,961 A | 7/1989 | Robinson et al. | 208/216 PP |
| 4,861,746 A | 8/1989 | Oishi et al. | 502/314 |
| 4,879,265 A | 11/1989 | Simpson et al. | 502/211 |
| 4,886,594 A | 12/1989 | Miller | 208/210 |
| 4,906,602 A | 3/1990 | Schneider et al. | 502/304 |
| 4,925,546 A | 5/1990 | Kukes et al. | 208/111 |
| 4,981,832 A | 1/1991 | Tawara et al. | 502/314 |
| 5,135,902 A | 8/1992 | Delaney et al. | 502/314 |
| 5,208,405 A | 5/1993 | Cheung et al. | 585/274 |
| 5,244,858 A | 9/1993 | Usui et al. | 502/220 |
| 5,266,188 A | 11/1993 | Kukes et al. | 208/216 R |
| 5,280,004 A | 1/1994 | Iino et al. | 502/314 |
| 5,336,394 A | 8/1994 | Iino et al. | 208/216 R |
| 5,348,928 A | 9/1994 | Kukes et al. | 502/306 |
| 5,389,595 A | 2/1995 | Simpson et al. | 502/315 |
| 5,494,568 A | 2/1996 | Simpson et al. | 208/46 |
| 5,686,375 A | 11/1997 | Iyer et al. | 502/315 |
| 5,906,731 A | 5/1999 | Abdo et al. | 208/216 R |
| 6,007,704 A | 12/1999 | Chapus et al. | 208/218 |
| 6,015,485 A | 1/2000 | Shukis et al. | 208/112 |
| 6,118,034 A | 9/2000 | Vicari et al. | 585/262 |
| 6,197,721 B1 | 3/2001 | Didillon et al. | 502/326 |
| 6,200,927 B1 | 3/2001 | Shukis et al. | 502/355 |
| 6,334,948 B1 | 1/2002 | Didillon et al. | 208/218 |
| 6,469,223 B2 | 10/2002 | Kelly et al. | 585/259 |
| 6,759,364 B2 * | 7/2004 | Bhan | 502/315 |

FOREIGN PATENT DOCUMENTS

| | | |
|---|---|---|
| GB | 1440230 | 8/1973 |
| WO | WO9302158 | 2/1993 |
| WO | 03/052031 A1 | 6/2003 |

* cited by examiner

PROCESS AND CATALYST FOR THE SELECTIVE HYDROGENATION OF DIOLEFINS CONTAINED IN AN OLEFIN CONTAINING STREAM AND FOR THE REMOVAL OF ARSENIC THEREFROM AND A METHOD OF MAKING SUCH CATALYST

This application claims the benefit of U.S. Provisional Application No. 60/478,797, filed Jun. 16, 2003.

BACKGROUND OF THE INVENTION

The invention relates to the selective hydrogenation of diolefins contained in a monoolefin-containing hydrocarbon stream and to the removal of arsenic therefrom. The invention also relates to a catalyst composition that is useful in the removal of arsenic and in the selective hydrogenation of diolefins contained in a monoolefin-containing hydrocarbon stream, and it relates to a method of making such a catalyst.

Gasoline regulations are increasingly creating a need to treat various refinery streams and products, for example, cracked gasoline blending material including coker naphtha and catalytically cracked gasoline, to remove the undesirable sulfur, arsenic and diolefin compounds contained in such refinery streams and products.

The removal of arsenic or arsenic compounds from a cracked gasoline blending material is of particular concern due to the poisoning effect that arsenic has on the catalysts used in subsequent or downstream treatment steps. It is, thus, desirable to remove the arsenic from a hydrocarbon stream having a concentration of arsenic prior to its further processing with an arsenic sensitive catalyst.

As for the presence of diolefins in a cracked gasoline material, these, too, can be undesirable compounds; since, they can cause a gasoline end product to be unstable, or they can cause unwanted problems in the further downstream processing of the cracked gasoline material.

It is desirable to have a process for catalytically removing both arsenic and diolefins that are contained in a cracked gasoline blending material having a concentration of monoolefins. One difficulty with such a process is finding a catalyst that will be able to remove the arsenic from such a process stream while still maintaining its activity for the hydrogenation of diolefins or sulfur, or both. Moreover, it is especially difficult for such a catalyst to have the dual functionality of the capacity to remove arsenic and to selectively hydrogenate diolefins contained in a cracked gasoline blending material without hydrogenating a significant portion of the monoolefins also contained therein.

SUMMARY OF THE INVENTION

It is, therefore, an object of the invention to provide a catalyst useful for the removal of arsenic from a hydrocarbon stream containing a concentration of arsenic.

Another object of the invention is to provide a catalyst that is useful in the selective hydrogenation of diolefins contained in a monoolefin-containing hydrocarbon stream.

Yet, another object of the invention is to provide a process for the selective hydrogenation of diolefins that are contained in a monoolefin-containing hydrocarbon stream, or for the removal of arsenic contained in such a hydrocarbon stream, or for the simultaneous selective hydrogenation of diolefin and removal of arsenic from a monoolefin-containing hydrocarbon stream having concentrations of both arsenic and diolefin.

Still, another object of the invention is to provide a method of manufacturing a catalyst having certain desirable properties that make it suitable for use in removing arsenic from a hydrocarbon stream, or for use in the selective hydrogenation of diolefins contained in such a monoolefin-containing hydrocarbon stream, or for use in the simultaneous selective hydrogenation of diolefins and arsenic removal of arsenic and diolefin contained in a monoolefin-containing hydrocarbon stream having concentrations of both arsenic and diolefin.

Thus, in accordance with one invention, provided is a catalyst composition that comprises a shaped mixture of a porous refractory oxide and a concentration of a first Group VIII metal that is no greater than about 5 weight percent of the total weight of the shaped mixture. The shaped mixture has been heat treated and includes a second Group VIII metal overlay in an amount such that the total amount of both the first Group VIII metal and the second Group VIII metal exceeds about 8 weight percent of the total weight of the catalyst composition.

In accordance with another invention, provided is a method of making a catalyst composition. This method includes mixing a porous refractory oxide and a first Group VIII metal compound in a manner so as to form a mixture comprising the porous refractory oxide and the first Group VIII metal compound, wherein the first Group VIII metal compound is substantially homogeneously dispersed in the mixture and is present in the mixture at a first Group VIII metal compound concentration. The mixture is formed into an agglomerate in which the first Group VIII metal compound concentration is such that the heat treatment of the agglomerate provides a first heat treated agglomerate having a first Group VIII metal concentration no greater than about 5 weight percent of the heat treated agglomerate. The first heat treated agglomerate is impregnated with a first impregnation solution, which comprises a second Group VIII metal compound, and with such an amount of the first impregnation solution so as to provide a first impregnated agglomerate having a second Group VIII metal compound concentration. The first impregnated agglomerate in which the second Group VIII metal compound concentration is such that the heat treatment provides a second heat treated agglomerate having a second Group VIII metal overlay, wherein the total amount of both first Group VIII metal and second Group VIII metal in the second heat treated agglomerate that exceeds 8 weight percent of the second heat treated agglomerate.

In accordance with yet another invention, a process is provided for removing arsenic from a monoolefin-containing hydrocarbon feed stream having a concentration of arsenic and a concentration of diolefin while selectively hydrogenating the diolefin in the monoolefin-containing hydrocarbon feed stream. The process includes contacting, under suitable reaction conditions, the monoolefin-containing hydrocarbon stream with a composition comprising a heat-treated mixture of porous refractory oxide and a first Group VIII metal. The heat-treated mixture is further overlaid with a second Group VIII metal. The total concentration of the first Group VIII metal and the second Group VIII metal in the composition exceeds about 8 weight percent of the composition. The process yields a monoolefin-containing hydrocarbon product stream having a reduced concentration of arsenic and a reduced concentration of diolefin that are below the arsenic and diolefin concentrations in the monoolefin-containing hydrocarbon feed streams.

DETAILED DESCRIPTION OF THE INVENTION

The invention is directed to a catalyst composition having the unique property of dual functionality in that it suitably can be used in the simultaneous removal of arsenic from a monoolefin-containing hydrocarbon stream having a concentration of arsenic while selectively hydrogenating the diolefins contained in such monoolefin-containing hydrocarbon stream. The invention is also directed to a method of making or preparing such a dual functionality catalyst composition and to a process for removing arsenic from a hydrocarbon stream having an arsenic concentration, or for selectively hydrogenating diolefins contained in a monoolefin containing hydrocarbon stream having a diolefin concentration, or for the simultaneous removal of arsenic from a monoolefin-containing hydrocarbon stream having an arsenic concentration and diolefin concentration while selectively hydrogenating the diolefins contained therein.

In one form, the catalyst composition is a mixture comprising, consisting essentially of, or consisting of a porous refractory oxide and a first Group VIII metal, wherein the mixture is shaped into agglomerate prior to the heat treatment thereof. The heat-treated agglomerate, or heat treated shaped mixture, is overlaid with a second Group VIII metal. The heat-treated shaped mixture having a second Group VIII metal overlay is heat treated to provide second heat-treated agglomerate that can suitably be used as the catalyst composition of the invention. The second heat treated agglomerate can be further overlaid with a Group VIB metal and heat treated to provide a third heat treated agglomerate that can also suitably be used as a catalyst composition of the invention.

Both the first Group VIII metal component and the second Group VIII metal component of the catalyst composition are those that suitably in combination provide a catalyst having the properties as described herein, and they can be selected from the group consisting of nickel, cobalt, palladium and platinum. Preferably, the first Group VIII metal and the second Group VIII metal are either nickel or cobalt and, most preferably, the first Group VIII metal and the second Group VIII metal are nickel. The first Group VIII metal and the second Group VIII metal components of the catalyst composition may be a different or the same metal, but, preferably, the first Group VIII metal is the same as the second Group VIII metal. Thus, in a preferred embodiment, the catalyst composition is a heat treated shaped mixture of a porous refractory oxide and nickel, wherein the nickel and porous refractory oxide are substantially homogeneously mixed so as to provide a substantially uniform concentration profile and a concentration of nickel within the heat treated shaped mixture, and wherein the heat treated shaped mixture further includes a nickel overlay.

The Group VIB metal component of the catalyst composition can be a metal selected from the group consisting of chromium, molybdenum and tungsten. The preferred Group VIB metal is either molybdenum or chromium and, most preferred, it is molybdenum. One embodiment of the catalyst composition can additionally include a Group VIB metal overlay such as a molybdenum overlay.

The metals contained in the catalyst composition can be in their elemental form or in the form of a metal compound, such as, for example, oxides, sulfides and the like. It is an especially significant and important aspect of this invention for the shaped agglomerate that is to be heat treated to contain at least a concentration of the first Group VIII metal upwardly to a maximum concentration of the first Group VIII metal prior to the heat treatment. It is this procedure, with the subsequent overlay of a second Group VIII metal, that provides the final catalyst composition having the novel properties as described herein. While not wanting to be held to a particular theory, it is in any event theorized that it is the combination of the formation of a heat treated agglomerate having a substantially uniform concentration profile of the first Group VIII metal with the overlay of the second Group VIII metal that provides for the superior properties exhibited by the catalyst composition.

There is a maximum concentration of the first Group VIII metal in the heat treated shaped agglomerate at which the beneficial properties of the catalyst composition are no longer achieved and, thus, the first Group VIII metal concentration in the first heat treated shaped agglomerate should be no greater than about 5 weight percent of the total weight of the first heat treated shaped agglomerate, with this weight percent being based on elemental metal regardless of the actual form in which the first Group VIII metal is in. For a catalyst composition having the best desired properties, the first Group VIII metal concentration in the first heat treated shaped agglomerate is in the range of from or about 0.2 weight percent to or about 4 weight percent; but, preferably, the first Group VIII metal concentration is in the range of from 0.5 weight percent to 3 weight percent and, most preferably, from 0.7 to 2 weight percent.

Concerning the amount of second Group VIII metal overlay in the catalyst composition, it is important for the catalyst composition to have a high enough total or overall Group VIII metal concentration, i.e. the sum of the first Group VIII metal and the second Group VIII metal, so as to provide a catalyst composition having the desired properties for the catalyst composition. The amount of second Group VIII metal overlay in the catalyst composition will then be such as to bring the total Group VIII metal concentration in the catalyst composition to within the range exceeding about 6 weight percent based on the total weight of the catalyst composition, with this weight percent also being based on elemental metal regardless of the actual form in which the first Group VIII and the second Group VIII metal is in. To better provide for the desired catalyst composition performance characteristics, the total Group VIII metal concentration in the catalyst composition is in the range exceeding 8 weight percent and, generally, upwardly to a total Group VIII metal concentration of about 25 or 30 weight percent. A preferred total Group VIII metal concentration in the catalyst composition is in the range of from 9 weight percent to 22 weight percent, and, most preferably, from 10 to 20 weight percent.

The catalyst composition may also include a second metal overlay of a Group VIB metal which can serve to promote the arsenic removal and diolefin selective hydrogenation properties of the catalyst composition. The amount of Group VIB metal overlay in the catalyst composition is such as to provide the desired catalytic properties and can be in the range exceeding about 8 weight percent of the catalyst composition, with this weight percent being based on elemental metal regardless of the actual form in which the Group VIB metal is in. Generally, the Group VIB metal concentration in the catalyst composition is in the range of from or about 8 weight percent to or about 20 weight percent. Preferably, the Group VIB metal concentration in the catalyst composition is in the range of from 9 to 15 weight percent, and, most preferably, from 10 to 13 weight percent of the total weight of the catalyst composition.

It is understood that the use herein of such terms as metal overlay or metal overlayer or overlaid metal or similar type terminology refers to the addition or incorporation of a metal into the heat treated shaped mixture. Indeed, the overlaying of a metal into the heat treated shaped mixture is, as noted above, a particularly important feature of the invention in that it is believed that the overlayering of the metal on top of the shaped mixture already having a substantially uniform concentration of metal and which has been suitably heat treated provides for the especially beneficial catalytic properties of the catalyst composition. It is preferred for the heat treated shaped mixture that has incorporated therein the additional overlay of metal to also be suitably heat treated after each such incorporation. Thus, after the incorporation of the second Group VIII metal into the heat treated shaped agglomerate, but before the incorporation of the Group VIB metal into the heat treated shaped agglomerate, the resulting composition is suitably heat treated to provide a second heat treated agglomerate having the overlay of second Group VIII metal. Subsequently, a Group VIB metal can be incorporated into the second heat treated agglomerate which is then suitably heat treated to provide a third heat treated agglomerate.

The porous refractory oxide of the catalyst composition can be any refractory oxide material that has the properties suitable for use as the support component of the catalyst composition. Examples of possible suitable porous refractory oxide materials include silica, magnesia, silica-titania, zirconia, silica-zirconia, titania, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 50 Angstroms to about 160 Angstroms, preferably, from 70 Angstroms to 150 Angstroms, and, most preferably, from 80 Angstroms to 130 Angstroms. The total pore volume of the porous refractory oxide, as measured by standard mercury porisimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 100 $m^2$/gram, and it is typically in the range of from about 100 to about 400 $m^2$/gram. As for the pore size distribution of the porous refractory oxide, at least of about 70 percent of the total pore volume is in the pores having diameters in the range of from 70 Angstroms to 150 Angstroms. More typical, at least 80 percent and even 90 percent of the total pore volume is in the pores having diameters in the range of from 70 Angstroms to 150 Angstroms.

In the first step of preparing the catalyst composition, a porous refractory oxide is mixed with a first Group VIII metal compound by any suitable means or method for providing a mixture in which the first Group VIII metal compound is dispersed, preferably homogeneously dispersed, within the mixture with the porous refractory oxide. Many of the possible mixing means that may suitably be used in preparing the mixture of porous refractory oxide and first Group VIII metal compound are described in detail in Perry's Chemical Engineers' Handbook, Sixth Edition, published by McGraw-Hill, Inc., at pages 19-14 through 19-24, which pages are incorporated herein by reference. Thus, possible suitable mixing means can include, but are not limited to, such devices as tumblers, stationary shells or troughs, Muller mixers, which are either batch type or continuous type, impact mixers, and any other mixer or device known to those skilled in the art and that will suitably provide the homogeneous mixture of porous refractory oxide and Group VIII metal compound.

To achieve the desired dispersion of the materials in the mixture, the materials are mixed until the components are substantially homogeneously dispersed. The mixing time is that which is sufficient to give a uniform mixture generally exceeding about 2 minutes and extending upwardly to as much as 45 minutes or even longer. The mixture is then formed into an agglomerate that is to be heat treated to provide a first heat treated agglomerate prior to the incorporation therein of additional Group VIII metal or other metal components.

Any suitable method or means for forming the agglomerate can be used, including, for example, molding, tableting, pressing, pelletizing, tumbling, densifying, and extruding. Extrusion methods are preferred.

It is a preferred embodiment of the invention for the mixture to be formed by co-mulling the porous refractory oxide and first Group VIII metal compound to thereby form a homogeneous mixture thereof. It is especially preferred to form an extrudable paste of the porous refractory oxide and first Group VIII metal compound that is agglomerated into an extrudate by using any suitable method known to those skilled in the art to extrude an extrudable paste through an extrusion die having openings of desired size and shape and cutting the extrudate to desired lengths. To form the extrudable paste, water and a dilute acid is added to the mixture of porous refractory oxide and first Group VIII metal compound during co-mulling thereof. The water and dilute acid are added in such amounts and by such methods as are required to give the extrudable paste of desired consistency. Any acid that suitably assists in providing the extrudable paste may be used including, for example, nitric acid, acetic acid, sulfuric acid, and hydrochloric acid, with nitric acid or acetic acid being preferred.

The first Group VIII metal compounds that can be used in forming the mixture with the porous refractory oxide are those compounds providing for the desired catalytic properties as described herein and which are selected from the group of compounds including elemental Group VIII metal, Group VIII metal acetates, Group VIII metal carbonates, Group VIII metal nitrates, Group VIII metal sulfates, and Group VIII metal thiocyanates. The preferred first Group VIII metal compound is nickel nitrate. The amount of first Group VIII metal compound introduced into the mixture will be such as to provide for a desired first Group VIII metal concentration in the first heat treated agglomerate that is no greater than about 5 weight percent of its total weight. Moreover, as noted above, the amount of first Group VIII metal compound in the mixture is such as to provide a first heat treated agglomerate having a concentration of first Group VIII metal in the range of from or about 0.2 weight percent to or about 4 weight percent; but, preferably, the first Group VIII metal concentration is in the range of from 0.5 weight percent to 3 weight percent and, most preferably, from 0.7 to 2 weight percent.

The shaped agglomerate of the mixture is heat treated to provide a first heat treated agglomerate. This heat treatment step can include a drying step before the required calcination step. The temperature range at which the shaped agglomerate is dried is from about 65° C. (150° F.) to about 260° C. (500° F.). Preferably, the drying temperature is in the range of from 88° C. (190° F.) to 232° C. (450° F.). The shaped agglomerate may be dried for a drying time period generally in the range of from about 0.5 hours to about 8 hours or until the amount of moisture in the shaped agglomerate has reached the desired level. The shaped agglomerate may be dried in the presence of oxygen, an inert gas, air or mixtures thereof.

The thus dried shaped agglomerate is calcined in the presence of oxygen or an oxygen-containing inert gas or air. The temperature at which the shaped agglomerate is calcined is generally in the range of from 371° C. (700° F.) to about 760° C. (1400° F.). Preferably, the calcination temperature is in the range of from 482° C. (900° F.) to 732° C. (1350° F.), and, more preferably, it is from 510° C. (950° F.) to 704° C. (1300° F.). The time for conducting the calcination is that which is required to remove the volatile matter and to convert substantially all the metal of the Group VIII metal compound contained in the shaped agglomerate to the form of metal oxide. The time required for the calcination is generally in the range of from about 0.5 hours to about 4 hours.

The first heat treated agglomerate is provided with an overlay of a second Group VIII metal compound by incorporating the second Group VIII metal compound into the first heat treated agglomerate. As defined above, when referring herein to an overlayer of metal in the catalyst composition, what is meant is that the metal overlayer results from the deposition of additional metal onto a heat treated agglomerate of a mixture of porous refractory oxide already having incorporated therein another metal.

To form the second Group VIII metal overlayer, it is preferred to use an impregnation procedure to impregnate the first heat treated agglomerate to provide a first impregnated agglomerate. Any impregnation procedure or method that suitably provides for the overlayer of second Group VIII metal in the first heat treated agglomerate at the required concentration levels can be used. Such impregnation methods include, for example, spray impregnation, soaking, multi-dip procedures, and incipient wetness impregnation methods. The first heat treated agglomerate is thus provided with an overlayer of the second Group VIII metal by contacting the first heat treated agglomerate with a first impregnation solution comprising a second Group VIII metal compound thereby providing the first impregnated agglomerate. The first impregnated agglomerate is then heat treated using the same methods and under the same conditions as is described above in detail for the heat treatment of the shaped agglomerate. This second heat treated agglomerate having a second Group VIII metal overlay can suitably be used as the dual functionality catalyst of the invention.

The first impregnation solution can generally comprise the second Group VIII metal compound dissolved in a suitable liquid solvent, such as water, alcohol or liquid hydrocarbon, for incorporating into the first heat treated agglomerate the second Group VIII metal by any of the impregnation methods noted above. The second Group VIII metal compounds used in the first impregnation solution can include, for example, Group VIII metal acetates, Group VIII metal carbonates, Group VIII metal nitrates, Group VIII metal sulfates, Group VIII metal thiocyanates and mixtures of any two or more thereof. The preferred first impregnation solution is an aqueous solution of a second Group VIII metal compound that is soluble in water. Such a first impregnation solution includes a Group VIII metal nitrate, e.g. nickel nitrate, dissolved in water. The concentration of the second Group VIII metal compound in the first impregnation solution is selected so as to provide the desired metal concentration in the catalyst composition intermediates or the final catalyst compositions of the invention. Typically, the concentration of the second Group VIII metal compound in the impregnation solution is in the range of from 0.01 to 100 moles per liter.

The amount of second Group VIII metal compound introduced into the first heat treated agglomerate will be such as to provide for a desired total Group VIII metal concentration in the second heat treated agglomerate that exceeds 6 weight percent of its total weight. Moreover, the amount of second Group VIII metal compound introduced into the first heat treated agglomerate is such as to provide for a total Group VIII metal concentration in the second heat treated agglomerate in the range exceeding 8 weight percent and upwardly to about 25 or even 30 weight percent. Preferably, the total concentration of Group VIII metal in the second heat treated agglomerate is in the range of from 9 to 22 weight percent and, most preferably, from 10 to 20 weight percent.

The catalyst composition can further include an overlayer of a Group VIB metal component. This embodiment of the catalyst composition is prepared by using any of the aforementioned impregnation means or methods to impregnate the second heat treated agglomerate with a second impregnation solution comprising a Group VIB metal compound to provide a second impregnated agglomerate. The second impregnated agglomerate is then heat treated to give the third heat treated agglomerate by using the same methods and under the same conditions as are described above in detail for the heat treatment of the shaped agglomerate.

The second impregnation solution can generally comprise a Group VIB metal compound dissolved in a suitable liquid solvent, such as water, alcohol or liquid hydrocarbon, for incorporating into the second heat treated agglomerate the Group VIB metal by any of the impregnation means or methods noted above. The Group VIB metal compounds used in the second impregnation solution can include, for example, elemental Group VIB metal, Group VIB metal oxides, Group VIB metal acetates, Group VIB metal carbonates, Group VIB metal nitrates, Group VIB metal sulfates, Group VIB metal thiocyanates and mixtures of any two or more thereof. The preferred second impregnation solution is an aqueous solution of a Group VIB metal compound that is soluble in water. The concentration of the Group VIB metal compound in the second impregnation solution is selected so as to provide the desired metal concentration in the catalyst composition intermediates or the final catalyst compositions of the invention. Typically, the concentration of the Group VIB metal compound in the impregnation solution is in the range of from 0.01 to 100 moles per liter.

The amount of Group VIB metal compound introduced into the second heat treated agglomerate will be such as to provide for a desired Group VIB metal concentration in the third heat treated agglomerate that exceeds about 8 weight percent of its total weight. Moreover, the amount of Group VIB metal compound introduced into the second heat treated agglomerate is such as to provide for a Group VIB metal concentration in the third heat treated agglomerate in the range of from or about 8 weight percent to or about 20 weight percent. Preferably, the total concentration of Group VIB metal in the third heat treated agglomerate is in the range of from 9 to 15 weight percent and, most preferably, from 10 to 13 weight percent.

The catalyst compositions described herein are used advantageously in the removal of arsenic and arsenic compounds contained in hydrocarbon streams having an arsenic concentration. A further unique property of the catalyst compositions is their ability to selectively hydrogenate diolefin compounds that are contained in a monoolefin containing hydrocarbon stream with a limited amount of simultaneous hydrogenation of the monoolefins. This dual functionality of the catalyst compositions make them uniquely suitable for use in the novel process for treating a monoolefin containing hydrocarbon having both a diolefin concentration and an arsenic concentration.

The novel process includes contacting, under reaction conditions, a hydrocarbon stream with any one of the catalyst compositions as described herein. Due to the special properties of the catalyst compositions, the process is particularly suitable for the treatment of hydrocarbon streams comprising monoolefins and diolefins. The hydrocarbon streams can further comprise arsenic. The process is especially useful in treating cracked refinery streams boiling in the range of from about 10° C. (50° F.) to about 505° C. (450° F.), preferably, from 339° C. (150° F.) to 494° C. (430° F.), at atmospheric pressure, i.e. naphtha or gasoline boiling range, that have a concentration of diolefin, or arsenic, or both. Examples of such cracked refinery streams that can suitably be used as a feed stock of the inventive process include cracked naptha streams, such as, fluid catalytic cracked naphtha or gasoline, coker naphtha, hydrocracker naphtha, resid hydrotreater naphtha, debutanized natural gasoline, and any other gasoline blending component from sources wherein a naphtha boiling range hydrocarbon stream is produced. But, because the fluid catalytically cracked and coker naphthas have such high concentrations of olefins, including monoolefins and diolefins, the process is particularly suited for treating these cracked refinery streams.

The preferred feed stream to be treated is a monoolefin containing hydrocarbon stream, which is preferably a cracked naphtha stream such as fluid catalytic cracked naphtha or coker naptha, or both. The monoolefin containing hydrocarbon stream generally comprises an overall monoolefin concentration ranging upwardly to about 60 weight percent of the monoolefin containing hydrocarbon stream. The monoolefin concentration in the monoolefin containing hydrocarbon stream, thus, can be in the range of from about 5 weight percent to about 50 weight percent and, more typically, the monoolefin concentration is in the range of from 15 weight percent to 45 weight percent.

The diolefin concentration in the monoolefin containing hydrocarbon stream can range from about 0.1 weight percent to as high as about 5 or even 10 weight percent of the monoolefin containing hydrocarbon stream; but, typically, it is in the range of from about 0.2 weight percent to about 5 weight percent. More typically, the diolefin concentration is in the range of from 0.3 weight percent to 4 weight percent and, most typically, from 0.5 weight percent to 3 weight percent.

In those monoolefin containing hydrocarbon streams having an arsenic concentration, the arsenic concentration can be in the range of from about 1 part per billion (ppb) to about 1000 ppb. But, more typically, the arsenic concentration is in the range of from 5 ppb to 500 ppb, and, most typically, from 10 to 100 ppb. The parts per billion values are based on the ratio of the weight of the elemental arsenic, regardless of its form, to weight of the monoolefin containing stream. It should be understood that the term arsenic, as used in this specification, refers both to elemental arsenic and to any other arsenic containing compound that may provide a concentration of arsenic in the monoolefin containing hydrocarbon stream that is treated in accordance with the inventive process. Thus, the term arsenic includes, for example, elemental arsenic, organic arsenic compounds, the hydrides of arsenic, such as arsine ($AsH_3$), the oxides of arsenic, the halides of arsenic, and the sulfides of arsenic. Arsine is a typical arsenic compound that provides an arsenic concentration in light monoolefin containing hydrocarbon streams such as ethylene and propylene streams. In the heavier monoolefin containing hydrocarbon streams, such as the cracked naphthas, the more typical arsenic compounds are organic arsenic.

In a preferred embodiment of the inventive process, a monoolefin containing hydrocarbon feed stream having a diolefin concentration and an arsenic concentration is contacted with a catalyst composition as described herein under suitable reaction conditions. The catalyst composition can be in the form of a bed of catalyst particles contained within a reactor vessel that defines a reaction zone. Suitable reaction conditions are maintained within the reaction zone into which the monoolefin containing hydrocarbon feed stream is introduced. A monoolefin containing hydrocarbon product is yielded from the reaction zone. The diolefin and arsenic concentrations in the monoolefin containing hydrocarbon product are reduced to below the concentrations of diolefins and arsenic in the monoolefin containing hydrocarbon feed stream.

One of the unique features of the inventive process is that it is capable of removing arsenic from the monoolefin containing hydrocarbon feed stream without causing a significant loss or reduction by hydrogenation of the monoolefin in the monoolefin containing hydrocarbon feed stream. For arsenic removal, it is a particularly advantageous aspect of the inventive process that there is no need for the use of severe or high temperature reaction conditions to achieve a significant reduction in arsenic concentration by the removal of arsenic from the monoolefin containing hydrocarbon feed stream. Only mild temperature conditions are needed to provide for an adequate arsenic removal. The contacting temperature for arsenic removal is, thus, in the range of from about 339° C. (150° F.) to about 422° C. (300° F.) and, preferably, from 353° C. (175° F.) to 408° C. (275° F.). The percentage of arsenic that is removed from the monoolefin containing hydrocarbon feed stream for the mild temperature conditions exceeds about 50 weight percent of the total weight of the arsenic. It is preferable for the percent arsenic removal to exceed 70 weight percent and, more preferably, the percent removal exceeds 80 or even 90 weight percent. Depending on the amount of arsenic that is in the monoolefin containing hydrocarbon feed stream, it is even possible to achieve as a high as 99 percent or greater arsenic removal. Percent arsenic removal is defined as the ratio of the difference in the amount of arsenic in the feed stream to be treated and the amount of arsenic in the treated product stream divided by the amount of arsenic in the feed stream with the ratio being multiplied by 100.

While the process provides for a high percentage of arsenic removal from a monoolefin containing hydrocarbon feed stream having a concentration of arsenic, it does not simultaneously significantly reduce the concentration of monoolefin in such feed stream. This selective removal of arsenic is an important aspect of the invention in that monoolefins are a desired component of cracked naphtha due to their high octane properties that make the cracked naphthas particularly good gasoline blending components. The monoolefin loss is less than 5 weight percent of the of the total weight of the monoolefins in the monoolefin containing hydrocarbon stream, and preferably, the monoolefin loss is less than 3 weight percent and even less than 1 weight percent. Percent monoolefin loss is defined as the ratio of the difference in the amount of monoolefin in the feed stream to be treated and the amount of monoolefin in the treated product stream divided by the amount of monoolefin in the feed stream with the ratio being multiplied by 100.

If it is desired to remove both arsenic and diolefins from the monoolefin containing hydrocarbon stream, this can be achieved at higher reaction temperature conditions than are required for arsenic removal alone; but, still, both the diolefin conversion and arsenic removal is achieved without the conversion or hydrogenation of a significant portion of the monoolefins in the monoolefin containing hydrocarbon feed stream. The contacting temperature for this dual arsenic removal and selective hydrogenation of diolefins is in the range of from about 408° C. (275° F.) to about 505° C. (450° F.), preferably, from 422° C. (300° F.) to 491° C. (425° F.), and, most preferably, from 436° C. (325° F.) to 478° C. (400° F.). The portion of diolefins in the monoolefin hydrocarbon stream that are hydrogenated is such that the concentration of diolefins in the monoolefin containing hydrocarbon product is less than 0.5 weight percent of the total weight of the monoolefin containing hydrocarbon product, preferably, less than 0.3 weight percent and, most preferably, less than 0.2 weight percent. The amount of monoolefin loss is comparable to the losses that apply for the process for arsenic removal alone, which is generally less than 5 weight percent of the total weight of the monoolefins in the monoolefin containing hydrocarbon stream, and preferably, the monoolefin loss is less than 3 weight percent and even less than 1 weight percent.

Other reaction conditions under which the monoolefin containing hydrocarbon feed stream is contacted with the catalyst composition include a contacting pressure, space velocity and hydrogen treat gas rate. The contacting pressure can range from about 50 to about 1000 psia, preferably, from about 200 psia to about 800 psia and, most preferably, from 400 to 700 psia. The flow rate at which the monoolefin containing hydrocarbon feed stream is charge to the reaction zone containing the catalyst composition is such as to provide a weight hourly space velocity ("WHSV") in the range exceeding 0 $hr^{-1}$ upwardly to about 20 $hr^{-1}$. The term "weight hourly space velocity", as used herein, means the numerical ratio of the rate at which a hydrocarbon feed is charged to the reaction zone in pounds per hour divided by the pounds of catalyst composition contained in the reaction zone to which the hydrocarbon feed is charged. The preferred WHSV is in the range of from 0.1 $hr^{-1}$ to 10 $hr^{-1}$, and most preferred, from 0.5 to 5 $hr^{-1}$. The hydrogen treat gas rate is the amount of hydrogen charged to the reaction zone with the hydrocarbon feed. The amount of hydrogen relative to the amount of hydrocarbon feed charged to the reaction zone is in the range upwardly to about 10,000 cubic meters hydrogen per cubic meters hydrocarbon feed, but, typically, it is in the range of from 10 to 1000 $m^3$ hydrogen per $m^3$ hydrocarbon feed. The preferred range for the hydrogen-to-hydrocarbon feed ratio is from 20 to 400 and, most preferred, from 20 to 200.

The following examples are presented to further illustrate the invention, but they are not to be construed as limiting the scope of the invention.

Example 1

This Example 1 describes one laboratory procedure for making an embodiment of the inventive heat treated shaped mixture of nickel and alumina having a nickel and molybdenum overlayer (Catalyst A) in accordance with one aspect of the invention. This Example also describes the preparation of a conventional hydrotreating catalyst that is an alumina extrudate promoted with nickel and molybdenum (Catalyst B). This conventional hydrotreating catalyst does not contain an underlayer of nickel in the alumina extrudate.

Catalyst A

A support was prepared by co-mulling for 40 minutes 3,984 g of wide pore alumina and an aqueous nickel nitrate solution comprising 153 g of nickel nitrate in 3,225 g of deionized water. The resulting mulled mixture was extruded through a 1.3 Trilobe™ die plate, dried at 125° C. and then calcined at 482° C. The resulting support comprised alumina and 1 wt % nickel.

691 g of the support was impregnated with 335 g of $Ni(NO_3)_2.6H_2O$ dissolved in 574 ml of deionized water, aged for 2 hours with occasional agitation, dried at 100° C. for 3 hours and then calcined at 482° C. for 2 hours. The resulting calcined, impregnated support was further impregnated with a second impregnation solution prepared as follows.

Two solutions were prepared and combined to form the second impregnation solution:

Solution #1 was made by combining 180.6 g of $(NH_4)_2Mo_2O_7$, 49.5 g of $MoO_3$, 35.4 g of 30% $H_2O_2$, 8.7 g of monoethanolamine (MEA) and 147.1 g of deionized water, heating the mixture to 65° C. to dissolve and then cooling to room temperature.

Solution #2 was made by combining 75.9 g of $Ni(NO_3)_2.6H_2O$ and 30.1 g of $NiCO_3$ with 100 g of deionized water and then adding 72.4 g of an 85% solution of $H_3PO_4$.

Solutions #1 and #2 were combined and sufficient deionized water added to bring the combined solution volume up to 540 ml to give the second impregnation solution. 750 g of the calcined impregnated support was impregnated with the combined solution, aged for 2 hours with occasional agitation, dried at 100° C. overnight and then calcined at 452° C. for 2 hours. The resulting catalyst is designated in these Examples as "Catalyst A." Analysis of Catalyst A showed that its composition was 9.4 wt % Ni, 12.2 wt % Mo, and 1.9 wt % P with the balance being alumina.

Catalyst B

A support is prepared by mulling for a sufficient time period 667 parts alumina powder, 1017 parts water, and 37 parts acetic acid. The resulting mixture is extruded into Trilobe™ shapes. The shapes are dried and then calcined at a temperature between 620-675° C. The resulting support contains essentially no catalytic metal components, such as, Group VIII and Group VIB metal or metal compounds. This support is impregnated with an impregnation solution prepared as follows.

Two solutions are prepared and combined to form the impregnation solution:

Solution #1 is made by mixing 207.5 parts ammonium dimolybdate (($NH_4$)$_2Mo_2O_7$), 104.5 parts $MoO_3$, 31.8 parts monoethanolamine (MEA), 42 parts 35% $H_2O_2$, and 218.4 parts deionized water.

Solution #2 is made by mixing 191.2 parts nickel nitrate solution, 37.4 parts nickel carbonate ($NiCO_3$), and 193.5 parts aqueous 75% $H_3PO_4$.

Solutions #1 and #2 are combined to form the impregnation solution. The support is impregnated with a sufficient amount of the impregnation solution to provide, after drying and calcination of the impregnated support, a Catalyst B having 3 wt % Ni, 13 wt % molybdenum, and 3.2 wt % phosphorus, based on the total weight of the catalyst. Catalyst B contains no underlayer of Group VIII metal or Group VIB metal.

Example 2

This Example 2 describes, generally, the experimental procedure used to measure the performance of catalyst compositions similar to Catalyst A and Catalyst B described in Example 1 in the hydrotreatment of a monoolefin-containing hydrocarbon feed stream, having concentrations of both arsenic and diolefin, to selectively remove arsenic and convert diolefin without an excessive simultaneous hydrogenation of the monoolefins in the feed stream.

A laboratory stainless steel isothermal tube reactor, having a nominal diameter of ¾ inch, was packed with a volume of the relevant catalyst (either Catalyst A or Catalyst B). The catalyst was supported by a layer 20 mesh silicon carbide and on top of the catalyst bed was placed a layer of 20 mesh silicon carbide. The catalyst was sulfided prior to passing the feed over it at hydrotreatment conditions. A heavy catalytically cracked gasoline feed (either Feed H or Feed L) was passed over the catalyst at various isothermal operating temperatures (175° F., 225° F., 275° F., 325° F., 375° F., 425° F.), but, otherwise, at the same reactor conditions of a liquid hourly space velocity (for hydrocarbon feed) of 4 $hr^{-1}$, a gaseous hourly space velocity (for hydrogen gas rate) of 389 $hr^{-1}$, and a pressure of 400 psig for each of the reaction temperatures. Each of the two feeds included the components in the approximate amounts as presented in Table 1.

TABLE 1

Approximate properties of heavy catalytically cracked gasoline feeds

| Component | Heavy Feed (H) | Lighter Feed (L) |
|---|---|---|
| Olefins (Bromine No.) | 38 | 86 |
| Arsenic (ppb) | 64 | 18 |
| Diene (%) | 1.2 | 2.0 |
| Sulfur (ppm) | 2,740 | 860 |

The percent diene conversion, percent change in bromine number, and percent arsenic removal accomplished with the use of the inventive catalyst at six different reaction temperatures are presented in Table 2 below.

TABLE 2

Performance in the diene conversion and arsenic removal relative to monoolefin saturation of an heat treated shaped mixture of nickel and alumina having a nickel and molybdenum overlayer

| Temperature (° F./° C.) | Diene Conversion (L) (%) | Diene Conversion (H) (%) | % Change in Bromine No. (L) | % Change in Bromine No. (H) | Arsenic Removal (L) (%) | Arsenic Removal (H) (%) |
|---|---|---|---|---|---|---|
| 175/79 | 14 | | 2 | | 47 | |
| 225/107 | 30 | | 3 | | 70 | |
| 275/135 | 35 | | 2 | | 50 | |
| 325/163 | 80 | 73 | -2 | 5 | 50 | 83 |
| 375/191 | 95 | | 0 | | 90 | |
| 425/218 | 99 | | -2 | | 97 | |

The percent diene conversion, percent change in bromine number, and percent arsenic removal accomplished with the use of the conventional catalyst at the various reactor temperatures are presented in Table 3 below.

TABLE 3

Performance of conventional nickel/molybdenum or alumina catalyst in diene conversion and arsenic removal relative to monoolefin saturation

| Temperature (° F./° C.) | Diene Conversion (L) (%) | Diene Conversion (H) (%) | % Change in Bromine No. (L) | % Change in Bromine No. (H) | Arsenic Removal (L) (%) | Arsenic Removal (H) (%) |
|---|---|---|---|---|---|---|
| 175/79 | 44 | | 1.4 | | | |
| 225/107 | 64 | | 1.5 | | 40 | |
| 275/135 | 93 | | -0.3 | | 20 | |
| 325/163 | 98 | | -12 | | 20 | |
| 375/191 | 99 | 99 | -30 | -16 | 50 | 83 |
| 425/218 | | 99 | | -43 | | 90 |

Figure 1:
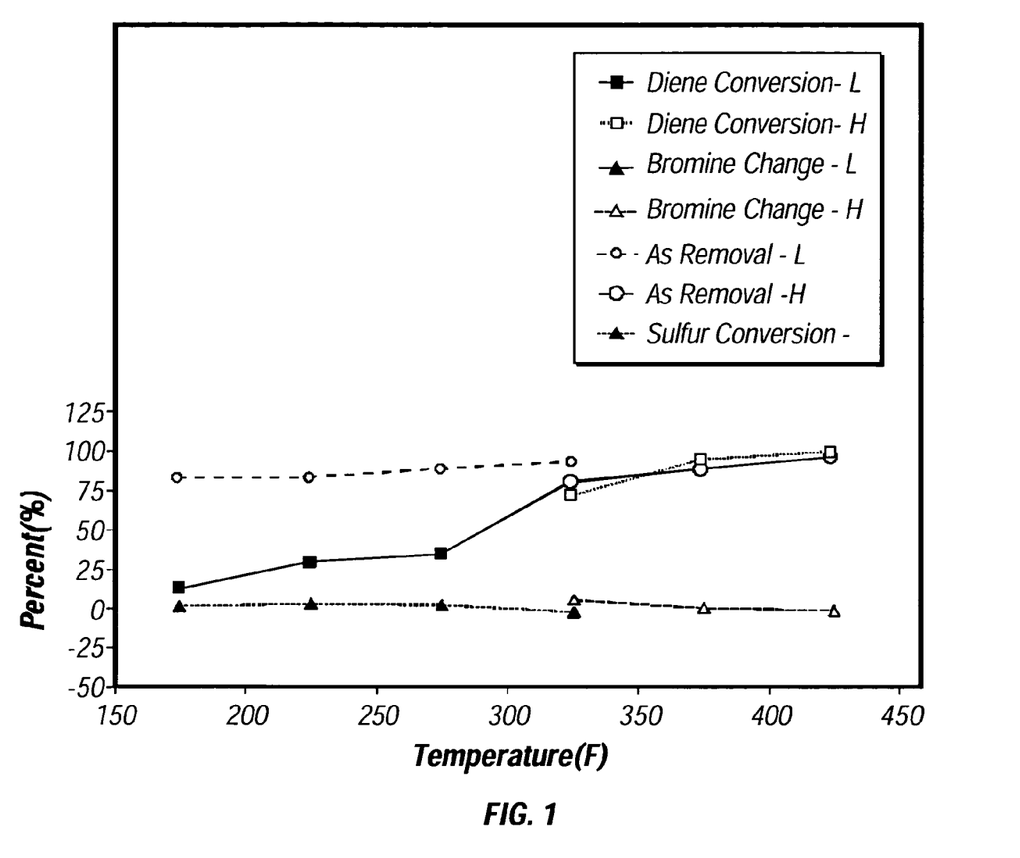
FIG. 1 presents several plots illustrating for the novel method of treating an monoolefin-containing hydrocarbon feed stream, which has an arsenic concentration and a diolefin concentration, the percent diolefin and percent arsenic removed from the monoolefin-containing hydrocarbon feed stream as a function of reaction temperature that are achieved with certain of the catalysts described herein. Also illustrated is the percent reduction in the monoolefin concentration (based on the change in bromine number) of the treated monoolefin-containing hydrocarbon stream as compared to the feed stream. The small change in monoolefin concentration indicates a limited amount of monoolefin hydrogenation that occurs with the novel method while still providing for a significant percentage of diolefin hydrogenation thereby demonstrating the selectivity of the diolefin hydrogenation.
Figure 2:
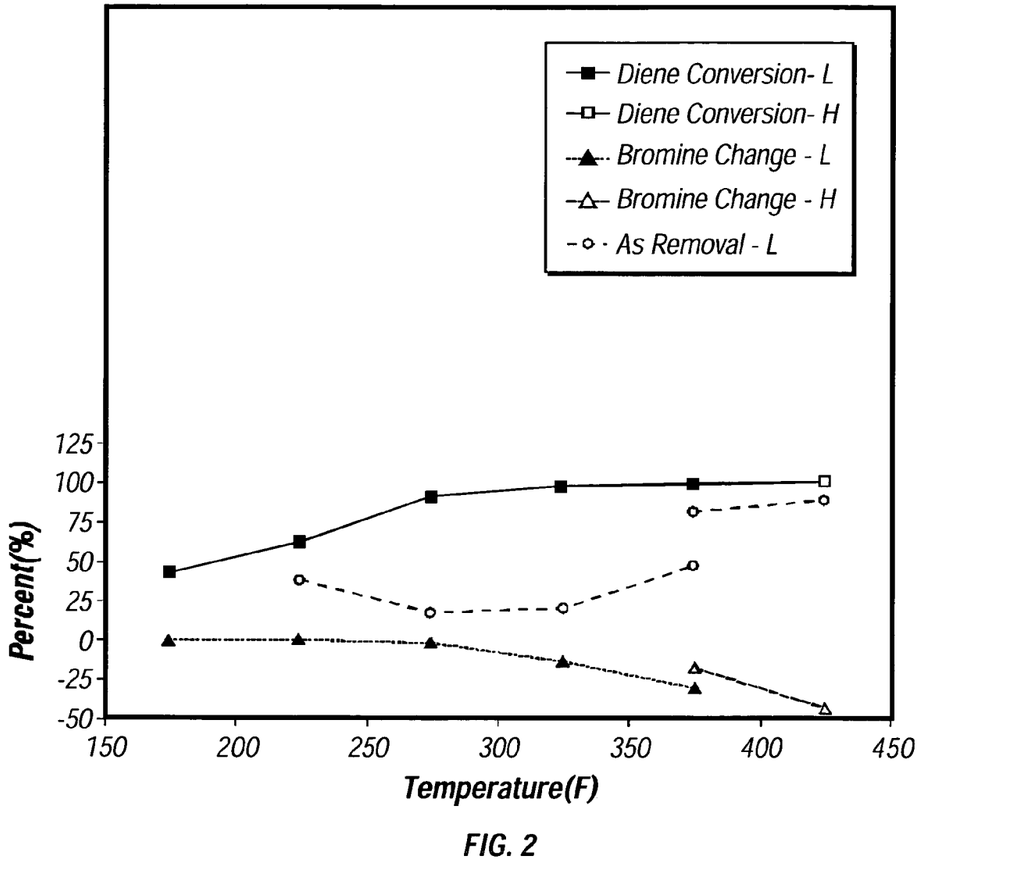
FIG. 2 presents several plots illustrating the results from the treatment of an monoolefin-containing hydrocarbon feed stream, which has an arsenic concentration and a diolefin concentration, using a commercially available alumina supported nickel and molybdenum hydroprocessing catalyst. Plotted is the percent diolefin and percent arsenic removed from the monoolefin-containing hydrocarbon feed stream and the percent reduction in the monoolefin concentration (based on the change in bromine number) all as a function of reaction temperature. The plots of FIG. 2 may be compared to those of FIG. 1 to demonstrate the significant difference in the selectivity of diolefin hydrogenation and in arsenic removal between the two treatment methods.

The data of Table 2 and Table 3 are respectively presented in the plots of FIG. 1 and FIG. 2. As can be seen from the above presented data, the inventive catalyst and process provides for a significant level of arsenic removal with a small amount of monoolefin saturation as reflected in a small percentage change in the bromine number. The arsenic removal approximates 50 percent or greater and exceeds the arsenic removal provided by the conventional catalyst. Also, as can be seen from the above presented data, the inventive catalyst and process provides for both high diene conversion and high arsenic removal but with a low amount of monoolefin saturation. The conventional catalyst, however, at similar reaction conditions provides for an excessively high amount of monoolefin saturation as compared to the inventive catalyst.

Reasonable variations, modifications and adaptations can be made within the scope of the described disclosure and the appended claims without departing from the scope of the invention.

That which is claimed is:

1. A catalyst composition for the selective hydrogenation of diolefins and the removal of arsenic from a hydrocarbon stream containing monoolefins and arsenic, comprising:
   a heat treated shaped mixture of a porous refractory oxide and from about 0.2 weight percent to 3 weight percent of a first Group VIII metal, wherein said heat treated shaped mixture has a material absence of a Group VIB metal and is overlaid with a second Group VIII metal such that the total amount of said first Group VIII metal and said second Group VIII metal in said composition exceeds 8 weight percent of said composition;
   and wherein said catalyst composition is capable of removing in excess of 50 weight percent of the arsenic present in said monoolefin-containing hydrocarbon stream, and converting diolefins in said monoolefin-containing stream such that the diolefin concentration in said stream is less than 0.5 weight percent, with less than 5 weight percent of monoolefin loss.

2. A composition as recited in claim 1, further comprising:
   an overlay of a Group VIB metal in an amount such that the concentration of said Group VIB metal in said composition exceeds about 8 weight percent of said composition.

3. A catalyst composition having dual functionality in that it is suitable for the use in the removal of arsenic from a monoolefin-containing hydrocarbon stream having a concentration of arsenic and a concentration of diolefin while selectively hydrogenating said diolefin in said monoolefin-containing hydrocarbon stream, said catalyst composition comprises:
   a shaped mixture consisting essentially of a porous refractory oxide and from about 0.2 weight percent to 3 weight percent of a first Group VIII metal, wherein said shaped mixture has been heat treated; and
   a second Group VIII metal overlay in an amount such that the total amount of both said first Group VIII metal and said second Group VIII metal in said catalyst composition is in the range of from 8 to 30 weight percent of said catalyst composition;
   and wherein said catalyst composition is capable of removing in excess of 50 weight percent of the arsenic present in said monoolefin-containing hydrocarbon stream, and converting diolefins in said monoolefin-containing stream such that the diolefin concentration remaining in said monoolefin-containing stream after conversion is less than 0.5 weight percent, with less than 5 weight percent of monoolefin loss.

4. A catalyst composition as recited in claim 3; wherein said first Group VIII metal concentration in said shaped mixture is in the range of from about 0.5 weight percent to 3 weight percent.

5. A catalyst composition as recited in claim 4; wherein total amount of both said first Group VIII metal and said second Group VIII metal in said shaped mixture is in the range of from 9 weight percent to 22 weight percent.

6. A catalyst composition as recited in claim 5; wherein both said first Group VIII metal and said second Group VIII metal is nickel.

7. A catalyst composition as recited in claim 6; wherein said porous refractory oxide has a material absence of a concentration of a magnesium component added to said porous refractory oxide.

8. A catalyst composition as recited in claim 7; wherein said porous refractory oxide has a material absence of a concentration of an alkali metal component added to said porous refractory oxide.

9. A catalyst composition as recited in claim 8, further comprising:
   a Group VIB metal overlay in an amount such that the total amount of said Group VIB metal in said catalyst composition is in the range exceeding about 8 weight percent of said catalyst composition.

10. A catalyst composition as recited in claim 3; wherein said first Group VIII metal concentration in said shaped mixture is in the range of from 0.7 weight percent to 2 weight percent.

11. A catalyst composition as recited in claim 1; wherein the total amount of both said first Group VIII metal and said second Group VIII metal in said shaped mixture is in the range of from 9 weight percent to 22 weight percent.

12. A catalyst composition as recited in claim 10; wherein the total amount of both said first Group VIII metal and said second Group VIII metal in said shaped mixture is in the range of from 10 weight percent to 20 weight percent.

13. A catalyst composition as recited in claim 12; wherein said catalyst composition is capable of converting diolefins in said monoolefin-containing stream such that the concentration of the diolefins in said stream after conversion is less than 0.3 weight percent with a monoolefin loss less than 3 weight percent.

14. A method of removing arsenic from an olefin-containing hydrocarbon feed stream having an arsenic concentration and a diolefin concentration while selectively hydrogenating said diolefin in said olefin-containing hydrocarbon feed stream, said process comprises:
   contacting, under suitable reaction conditions, said olefin-containing hydrocarbon stream with a composition comprising a heat treated shaped mixture of a porous refractory oxide and from about 0.2 weight percent to 3 weight percent of a Group VIII metal, wherein said heat treated shaped mixture has a material absence of a Group VIB metal and is overlaid with said Group VIII metal such that the concentration of said Group VIII metal in said composition exceeds 8 weight percent of said composition.

15. A method as recited in claim 14, wherein said arsenic concentration is in the range of from about 1 ppb to about 1000 ppb and said diolefin concentration is in the range of from about 0.1 weight percent to about 10 weight percent.

16. A method as recited in claim 15, wherein the amount of arsenic removed from said monoolefin-containing feed stream to give said monoolefin-containing hydrocarbon product stream exceeds about 50 weight percent of the total weight of the arsenic in said monoolefin-containing feed stream.

17. A method as recited in claim 16, wherein the amount diolefins in said monoolefin-containing feed stream converted is such as to provide said reduced concentration of diolefin in said monoolefin-containing hydrocarbon stream to less than 0.5 weight percent of said monoolefin-containing hydrocarbon stream.

18. A method as recited in claim 17, wherein the amount of monoolefin loss is less than 5 weight percent of the total weight of the monoolefins in said monoolefin-containing feed stream.

* * * * *